(12) United States Patent
Hong

(10) Patent No.: US 11,985,620 B2
(45) Date of Patent: May 14, 2024

(54) NETWORK REGISTRATION METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 422 days.

(21) Appl. No.: 17/298,902

(22) PCT Filed: Dec. 17, 2018

(86) PCT No.: PCT/CN2018/121556
§ 371 (c)(1),
(2) Date: Jun. 1, 2021

(87) PCT Pub. No.: WO2020/124322
PCT Pub. Date: Jun. 25, 2020

(65) Prior Publication Data
US 2022/0022154 A1 Jan. 20, 2022

(51) Int. Cl.
H04W 4/80 (2018.01)
H04B 7/185 (2006.01)
H04W 60/00 (2009.01)

(52) U.S. Cl.
CPC ........ H04W 60/00 (2013.01); H04B 7/18506 (2013.01); H04W 4/80 (2018.02)

(58) Field of Classification Search
CPC .... H04W 60/00; H04W 4/80; H04W 7/18506
USPC ...................................... 455/435.1
See application file for complete search history.

(56) References Cited

U.S. PATENT DOCUMENTS

2016/0288905 A1  10/2016  Gong et al.
2016/0292403 A1  10/2016  Gong et al.
(Continued)

FOREIGN PATENT DOCUMENTS

| CN | 106100721 A | 11/2016 |
| CN | 107357315 A | 11/2017 |
| CN | 107409051 A | 11/2017 |
| CN | 108401477 A | 8/2018 |

OTHER PUBLICATIONS

Intel. "FS ID_UAS: Update Definition and Use Case 5.1", S1-182298, No. 3GPP TSG-SA WG1 Meeting #83, Aug. 10, 2018 (Aug. 10, 2018), pp. 1-3, sections 5.1.1-5.1.3.
(Continued)

Primary Examiner — Ted M Wang
(74) Attorney, Agent, or Firm — Syncoda LLC; Feng Ma

(57) ABSTRACT

A network registration method includes: generating first non-access stratum (NAS) signaling, the first NAS signaling comprising first identity identifier information concerning a first user device and second identity identifier information concerning a second user device, wherein when the first user device is an unmanned aerial vehicle, the second user device is an unmanned aerial vehicle controller, and when the first user device is an unmanned aerial vehicle controller, the second user device is an unmanned aerial vehicle; and sending the first NAS signaling to a core network to request for registration of pairing information concerning the unmanned aerial vehicle and the unmanned aerial vehicle controller.

17 Claims, 16 Drawing Sheets

(56) References Cited

U.S. PATENT DOCUMENTS

| | | |
|---|---|---|
| 2016/0292696 A1 | 10/2016 | Gong et al. |
| 2017/0169713 A1 | 6/2017 | Gong et al. |
| 2018/0082308 A1 | 3/2018 | Gong et al. |
| 2018/0211263 A1 | 7/2018 | Gong et al. |
| 2019/0123864 A1* | 4/2019 | Zhang .................... H04L 5/005 |
| 2020/0015301 A1* | 1/2020 | Zhang .................. H04W 12/03 |

OTHER PUBLICATIONS

3GPP TSG SA. "Remote Identification of Unmanned Aerial Systems; Stage 1(Release 16)", 3GPP TR 22.8de V1.0.0 (May 2018), Aug. 28, 2018 (Aug. 28, 2018), pp. 7-9, section 5.1.

Intel. "FS ID UAS: Use Case for UAS Discovery", S1-182299, No. 3GPP TSG-SA WG1 Meeting #83, Aug. 10, 2018 (Aug. 10, 2018) pp. 1-3, sections 5.X.1-5.1.3.

Intel. "FS ID UAS: Use Case of UAS Identification via UAV Controller", S1-182301. No. 3GPP TSG-SA WGI Meeting #83. Aug. 10, 2018 (Aug. 10, 2018), entire document.

International Search Report in the international application No. PCT/CN2018/121556, mailed on Sep. 18, 2019.

Written Opinion of the International Search Authority in the international application No. PCT/CN2018/121556, mailed on Sep. 18, 2019.

First Office Action of the Chinese application No. 201880002858.8, issued on Oct. 12, 2020.

Second Office Action of the Chinese application No. 201880002858.8, issued on Jun. 30, 2021.

\* cited by examiner

NETWORK REGISTRATION METHOD AND APPARATUS

CROSS-REFERENCE TO RELATED APPLICATION

This application is a national stage of International Application No. PCT/CN2018/121556 filed on Dec. 17, 2018, the disclosure of which is hereby incorporated by reference in its entirety.

TECHNICAL FIELD

The disclosure relates to the technical field of communications, and more particularly, to a network registration method and apparatus.

BACKGROUND

In a related art, with the development of scientific technologies, unmanned aerial vehicles (UAVs) are widely applied in various fields such as aerial photography, transportation, monitoring and the like. The UAV flies under the control of a controller. For the characteristic of long-distance flight of the UAV, the UAV needs to perform a long-distance communication with the controller. Since near-field communication modes such as a wireless fidelity (WiFi) network and the like cannot meet the requirement of the long-distance communication, the UAV communicates with the controller through a mobile cellular network. At present, there are no effective solutions on how the UAV and the controller are registered to a core network.

SUMMARY

The embodiments of the disclosure provide a network registration method and apparatus. The technical solutions are as follows.

According to a first aspect of embodiments of the disclosure, a network registration method is provided, which may be applied to a first user device and includes: generating first non-access stratum (NAS) signaling; the first NAS signaling including first identity information of a first user device and second identity information of a second user device, the second user device being an unmanned aerial vehicle (UAV) controller responsive to that the first user device is a UAV, and the second user device being the UAV responsive to that the first user device is the UAV controller; and sending the first NAS signaling to a core network, to request registration of pairing information of the UAV and the UAV controller.

The technical solution provided by the embodiment of the disclosure may achieve the following beneficial effects: the embodiment provides the implementation solution in which the UAV or the UAV controller registers pairing to a mobile cellular network, thereby facilitating subsequent communication between the UAV or the UAV controller through the mobile cellular network.

In an embodiment, the first NAS signaling may include attach request signaling.

The technical solution provided by the embodiment of the disclosure may achieve the following beneficial effect: the embodiment may implement the pairing registration process through an attach process, such that no additional communication process is increased to save the network resource.

In an embodiment, before the first NAS signaling is generated, the method may further include: pairing is performed with the second user device through a near-field communication technology to acquire the second identity information during the pairing.

The technical solution provided by the embodiment of the disclosure may achieve the following beneficial effect: in the embodiment, the UAV and the UAV controller may implement the pairing through the near-field communication technology to acquire the identity information of the opposite terminal, which is not limited to the mobile cellular network.

In an embodiment, the method may further include: second NAS signaling fed back by the core network and indicating a registration success is received.

The technical solution provided by the embodiment of the disclosure may achieve the following beneficial effect: in the embodiment, the core network may feed registration success information back to the first user device.

In an embodiment, the method may further include: a notification message indicating the registration success is sent to the second user device.

The technical solution provided by the embodiment of the disclosure may achieve the following beneficial effect: in the embodiment, the first user device may further notify the second user device of the registration success.

In an embodiment, the method may further include: a pairing cancellation request message is sent to the second user device through a near-field communication technology, and a pairing request message is sent to a third user device through the near-field communication technology; or, a pairing request message is sent to the third user device through the near-field communication technology, and pairing with the second user device is canceled.

The technical solution provided by the embodiment of the disclosure may achieve the following beneficial effect: the embodiment provides multiple implementation solutions in which the first user device is canceled to be paired with the second user device, and then is paired with the third user device, and thus is applied to multiple application scenarios.

In an embodiment, the method may further include: third NAS signaling indicating de-registration is sent to the core network, to request de-registration of pairing registration of the first user device and the second user device; fourth NAS signaling fed back by the core network and indicating a de-registration success is received; and fifth NAS signaling indicating registration is sent to the core network, and the fifth NAS signaling includes the first identity information of the first user device and third identity information of the third user device.

The technical solution provided by the embodiment of the disclosure may achieve the following beneficial effect: the embodiment provides the solution for changing the registered and bound opposite user device.

In an embodiment, the third NAS signaling may include attach cancellation request signaling.

The technical solution provided by the embodiment of the disclosure may achieve the following beneficial effect: the embodiment may provide the attach cancellation process to cancel the registration and binding.

According to a second aspect of embodiments of the disclosure, a network registration method is provided, which may be applied to a core network side, and includes: receiving first NAS signaling sent from a first user device; the first NAS signaling including first identity information of the first user device and second identity information of a second user device, the second user device being an unmanned aerial vehicle (UAV) controller responsive to that the first user device is a UAV, and the second user device being the UAV responsive to that the first user device is the UAV controller; and sending a first registration request message to an unmanned aircraft systems (UAS) traffic management (UTM), the first registration request message including a first identity and a second identity.

In an embodiment, the first NAS signaling may include attach request signaling.

In an embodiment, the method may further include: second NAS signaling indicating a registration success is sent to the first user device.

In an embodiment, the method may further include: third NAS signaling sent from the first user device and indicating de-registration is received, to request de-registration of pairing registration of the first user device and the second user device; a first registration cancellation request message is sent to the UTM; fourth NAS signaling indicating a de-registration success is sent to the first user device; fifth NAS signaling sent from the first user device is received, and the fifth NAS signaling includes the first identity information of the first user device and third identity information of a third user device; and a second registration request message is sent to the UTM, and the second registration request message includes the first identity and a third identity.

According to a third aspect of embodiments of the disclosure, a network registration method is provided, which may be applied to a UTM, and includes: receiving a first registration request message sent from a core network, the first registration request message including a first identity and a second identity; establishing a corresponding relationship between the first identity and the second identity.

In an embodiment, the method may further include: a first registration cancellation request message sent from the core network is received; the corresponding relationship between the first identity and the second identity is canceled; a second registration request message sent from the core network is received, and the second registration request message includes the first identity and a third identity; a corresponding relationship between the first identity and the third identity is established.

According to a fourth aspect of embodiments of the disclosure, a network registration apparatus is provided, which may be applied to a first user device, and includes a generation module and a first sending module.

The generation module is configured to generate first NAS signaling. The first NAS signaling includes first identity information of a first user device and second identity information of a second user device, the second user device is an unmanned aerial vehicle (UAV) controller responsive to that the first user device is a UAV, and the second user device is the UAV responsive to that the first user device is the UAV controller.

The first sending module is configured to send the first NAS signaling a core network, to request registration of pairing information of the UAV and the UAV controller.

In an embodiment, the first NAS signaling may include attach request signaling.

In an embodiment, the apparatus may further include a pairing module.

The pairing module is configured to perform pairing with the second user device through a near-field communication technology to acquire the second identity information during the pairing.

In an embodiment, the apparatus may further include a first receiving module.

The first receiving module is configured to receive second NAS signaling fed back by the core network and indicating a registration success.

In an embodiment, the apparatus may further include a second sending module.

The second sending module is configured to send a notification message indicating the registration success to the second user device.

In an embodiment, the apparatus may further include a third sending module and a fourth sending module, or a fifth sending module.

The third sending module is configured to send a pairing cancellation request message to the second user device through a near-field communication technology.

The fourth sending module is configured to send a pairing request message to a third user device through the near-field communication technology.

The fifth sending module is configured to send a pairing request message to the third user device through the near-field communication technology, and cancel pairing with the second user device.

In an embodiment, the apparatus may further include a sixth sending module, a second receiving module and a seventh sending module.

The sixth sending module is configured to send third NAS signaling indicating de-registration to the core network, to request de-registration of pairing registration of the first user device and the second user device.

The second receiving module is configured to receive fourth NAS signaling fed back by the core network and indicating a de-registration success.

The seventh sending module is configured to send fifth NAS signaling indicating registration to the core network, and the fifth NAS signaling includes the first identity information of the first user device and third identity information of the third user device.

In an embodiment, the third NAS signaling may include attach cancellation request signaling.

According to a fifth aspect of embodiments of the disclosure, a network registration apparatus is provided, which may be applied to a core network side, and includes a first receiving module and a first sending module.

The first receiving module is configured to receive first NAS signaling sent from a first user device. The first NAS signaling includes first identity information of the first user device and second identity information of a second user device, the second user device is an unmanned aerial vehicle (UAV) controller responsive to that the first user device is a UAV, and the second user device is the UAV responsive to that the first user device is the UAV controller.

The first sending module is configured to send a first registration request message to a UTM, and the first registration request message includes a first identity and a second identity.

In an embodiment, the first NAS signaling may include attach request signaling.

In an embodiment, the apparatus may further include a second sending module.

The second sending module is configured to send second NAS signaling indicating a registration success to the first user device.

In an embodiment, the apparatus may further include a second receiving module, a third sending module, a fourth sending module, a third receiving module and a fifth sending module.

The second receiving module is configured to receive third NAS signaling sent from the first user device and indicating de-registration, to request de-registration of pairing registration of the first user device and the second user device.

The third sending module is configured to send a first registration cancellation request message to the UTM.

The fourth sending module is configured to send fourth NAS signaling indicating a de-registration success to the first user device.

The third receiving module is configured to receive fifth NAS signaling sent from the first user device, and the fifth NAS signaling includes the first identity information of the first user device and third identity information of a third user device.

The fifth sending module is configured to send a second registration request message to the UTM, and the second registration request message includes the first identity and a third identity.

According to a sixth aspect of embodiments of the disclosure, a network registration apparatus is provided, which may be applied to a UTM, and includes a first receiving module and a first establishment module.

The first receiving module is configured to receive a first registration request message sent from a core network, and the first registration request message includes a first identity and a second identity.

The first establishment module is configured to establish a corresponding relationship between the first identity and the second identity.

In an embodiment, the apparatus may further include a second receiving module, a cancellation module, a third receiving module and a second establishment module.

The second receiving module is configured to receive a first registration cancellation request message sent from the core network.

The cancellation module is configured to cancel the corresponding relationship between the first identity and the second identity.

The third receiving module is configured to receive a second registration request message sent from the core network, and the second registration request message includes the first identity and a third identity.

The second establishment module is configured to establish a corresponding relationship between the first identity and the third identity.

According to a seventh aspect of embodiments of the disclosure, a network registration apparatus is provided, which may include a processor and a memory which is configured to store instructions executable by the processor.

The processor is configured to:
generate first non-access stratum (NAS) signaling, the first NAS signaling including first identity information of a first user device and second identity information of a second user device, the second user device being an unmanned aerial vehicle (UAV) controller responsive to that the first user device is a UAV, and the second user device being the UAV responsive to that the first user device is the UAV controller; and
send the first NAS signaling to the core network, to request registration of pairing information of the UAV and the UAV controller.

According to an eighth aspect of embodiments of the disclosure, a network registration apparatus is provided, which may include a processor and a memory which is configured to store instructions executable by the processor.

The processor is configured to:
receive first NAS signaling sent from a first user device, the first NAS signaling including first identity information of the first user device and second identity information of a second user device, the second user device being an unmanned aerial vehicle (UAV) controller responsive to that the first user device is a UAV, and the second user device being the UAV responsive to that the first user device is the UAV controller; and
send a first registration request message to a UTM, the first registration request message including a first identity and a second identity.

According to a ninth aspect of embodiments of the disclosure, a network registration apparatus is provided, which may include a processor and a memory which is configured to store instructions executable by the processor.

The processor is configured to:
receive a first registration request message sent from a core network, the first registration request message including a first identity and a second identity; and
establish a corresponding relationship between the first identity and the second identity.

According to a tenth aspect of embodiments of the disclosure, a non-transitory computer-readable storage medium is provided, on which computer instructions are stored. The instructions are executed by a processor to implement the method in the first aspect.

According to an eleventh aspect of embodiments of the disclosure, a non-transitory computer-readable storage medium is provided, on which computer instructions are stored. The instructions are executed by a processor to implement the method in the second aspect.

According to a twelfth aspect of embodiments of the disclosure, a non-transitory computer-readable storage medium is provided, on which computer instructions are stored. The instructions are executed by a processor to implement the method in the third aspect.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

In a related art, with the development of scientific technologies, UAVs are widely applied in various fields such as aerial photography, transportation, monitoring and the like. The UAV flies under the control of a controller. For the characteristic of long-distance flight of the UAV, the UAV needs to perform a long-distance communication with the controller. Since near-field communication manners such as a WiFi network and the like cannot meet the requirement of the long-distance communication, the UAV communicates with the controller through a mobile cellular network. At present, there are no effective solutions on how the UAV and the controller are registered to a core network.

In order to solve the above-mentioned problems, the embodiments provide a communication path for the UAV or the UAV controller and the core network. Through the path, the UAV or the UAV controller may send pairing information to the core network, to request pairing registration to the core network. The mobile cellular network has the characteristics of wide coverage and long-distance communication, which is helpful to long-distance transmission between the UAV and the UAV controller.

Figure 1:
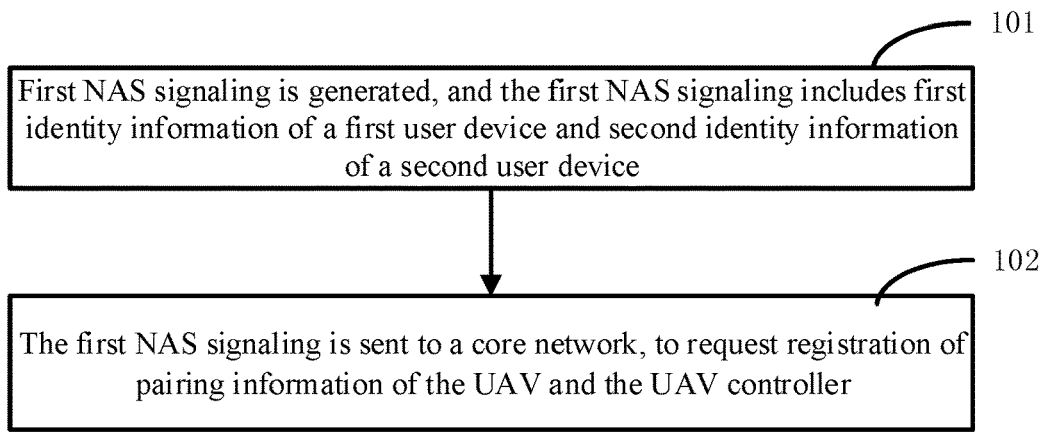
FIG. 1 is a flow chart showing a network registration method, according to an exemplary embodiment.

FIG. 1 is a flow chart showing a network registration method, according to an exemplary embodiment. The network registration method is applied to a user device. As illustrated in FIG. 1, the method may include the following steps 101 to 102.

In step 101, first NAS signaling is generated, and the first NAS signaling includes first identity information of a first user device and second identity information of a second user device. When the first user device is a UAV, the second user device is a UAV controller; and when the first user device is the UAV controller, the second user device is the UAV.

In step 102, the first NAS signaling is sent to a core network, to request registration of pairing information of the UAV and the UAV controller.

In the embodiment, when the first user device is the UAV, the second user device is the UAV controller, and when the first user device is the UAV controller, the second user device is the UAV.

Either the UAV or the UAV controller may automatically search a mobile cellular network after paired, access the mobile cellular network, and send pairing information to the core network, i.e., the first identity information of the first user device and the second identity information of the second user device, to request pairing registration. Both the UAV and the UAV controller may respectively send the first NAS signaling to the core network, which is equivalent to that the above process is executed for two times.

The embodiment may implement reporting of the pairing information through various types of NAS signaling, thereby implementing the pairing registration.

The core network may perform the pairing registration on the UAV and the UAV controller upon the reception of the first NAS signaling, and may allow that the UAV and the UAV controller communicate subsequently through the mobile cellular network.

The core network may obtain a first identity and a second identity through the pairing registration process, obtains the pairing registration request of the first user device and the second identity on one hand, and may further perform identity identification on the first identity and the second identity on the other hand, determine whether the first identity and the second identity meet an identity rule of the UAV and the UAV controller, and determine that the request is a legal pairing registration request if the first identity and the second identity meet the identity rule.

In an embodiment, the first NAS signaling may include attach request signaling.

The embodiment may implement the pairing registration process of the UAV and the UAV controller through an attach process, such that no additional communication process is increased to save the network resource.

In an embodiment, before the first NAS signaling is generated, the method may further include step A.

In step A, pairing is performed with the second user device through a near-field communication technology to acquire the second identity information during the pairing.

In the embodiment, after the first user device is started or restarted, the first user device may make an attempt to pair with the second user device through the near-field communication technology, and acquire the second identity information of the second user device in the pairing process. The pairing process may not be limited by the mobile cellular network.

The near-field communication technology may be the WiFi network, device to device (D2D), or the like.

In an embodiment, the method may further include step B.

In step B, second NAS signaling fed back by the core network and indicating a registration success is received.

The core network may perform the pairing registration on the UAV and the UAV controller upon the reception of the first NAS signaling, thereby completing the registration process. The core network may further notify the first user device of the registration success through the second NAS signaling, thereby facilitating subsequent processing of the first user device.

The second NAS signaling may be attach response signaling. The embodiment notifies the registration success through the attach process, such that no additional communication process is increased to save the network resource.

In an embodiment, the method may further include step C.

In step C, a notification message indicating the registration success is sent to the second user device.

In the embodiment, one of the first user device and the second user device may send the first NAS signaling to the core network to request the pairing registration. One of the first user device and the second user device sending the first NAS signaling to the core network may be pre-configured by the UAV operator or manufacturer. Since the other one does not participate in the request process of the pairing registration and does not know whether the registration is successful, the user device sending the first NAS signaling needs to notify the other user device of the registration success. In the embodiment, the first user device sends the notification message indicating the registration success to the second user device. In the subsequent process, the first user device may communicate with the second user device.

Certainly, the first user device and the second user device may respectively send the first NAS signaling to the core network. The core network respectively sends the second NAS signaling indicating the registration success to the first user device and the second user device. In this way, the first user device and the second user device may know the registration success, and thus may not execute step C and not send the notification message to each other.

In an embodiment, the method may further include step D1 to step D2, or include step D3.

In step D1, a pairing cancellation request message is sent to the second user device through the near-field communication technology.

In step D2, a pairing request message is sent to a third user device through the near-field communication technology.

In the embodiment, the first user device may change the paired and bound second user device to pair and bind with the third user device. With this requirement, the first user device sends the pairing cancellation request message to the second user device through the near-field communication technology; and by sending the pairing cancellation request message, the pairing with the second user device is canceled, and the second user device is also notified of canceling the pairing. The first user device sends the pairing request message to the third user device through the near-field communication technology, to request the pairing with the third user device. The change of the second user device to the third user device is implemented.

Since the first user device has canceled the pairing with the second user device, the second user device may directly send the pairing request message to a fourth user device.

In step D3, a pairing request message is sent to the third user device through the near-field communication technology, and pairing with the second user device is canceled.

In the embodiment, when needing to change the second user device, the first user device may not send the pairing cancellation request message to the second user device, but delete the pairing information with the second user device directly and locally and send the pairing request message to the third user device.

The second user device cannot obtain a response of the first user device after sending the information to the first user device, and thus naturally knows that the pairing with the first user device is canceled. The second user device may directly send the pairing request message to the fourth user device.

In an embodiment, the method may further include step E1 to step E3.

In step E1, third NAS signaling indicating de-registration is sent to the core network, to request de-registration of pairing registration of the first user device and the second user device.

In step E2, fourth NAS signaling fed back by the core network and indicating a de-registration success is received.

In step E3, fifth NAS signaling indicating registration is sent to the core network, and the fifth NAS signaling includes the first identity information of the first user device and third identity information of the third user device.

In the embodiment, after canceling the pairing with the second user device through the near-field communication technology, the first user device further needs to de-register the pairing registration to the core network. Therefore, in the embodiment, the first user device may request the de-registration of the pairing registration of the first user device and the second user device through the third NAS signaling. The core network performs the processing of de-registering the pairing registration, and then feeds the fourth NAS signaling back to the first user device to notify the first user device of the de-registration success. The core network may further send the fourth NAS signaling to the second user device to notify the second user device of the de-registration success.

The first user device sends the fifth NAS signaling indicating the registration to the core network again, to request the registration of the pairing information of the first user device and the third user device to the core network.

Or, step E1 and step E2 are executed first. The first user device requests de-registration of a pairing registration relationship with the second user device. step D1 and step D2 are then executed. The first user device sends the pairing cancellation request message to the second user device, and the second user device knows that the pairing registration relationship has been de-registered in the core network. After the first user device is paired with the third user device, step E3 is then executed. The pairing relationship between the first user device and the third user device is registered to the core network.

Or, step E1 and step E2 are executed first. The first user device requests de-registration of the pairing registration relationship with the second user device. The first user device sends the notification message of the de-registration success to the second user device. The second user device knows that the pairing registration relationship has been de-registered in the core network. Step D3 is then executed. The first user device is paired with the third user device. Then, step E3 is executed. The pairing relationship between the first user device and the third user device is registered to the core network.

In an embodiment, the third NAS signaling may include attach cancellation request signaling.

The embodiment implements, through an attach cancellation process, the process of de-registering the pairing registration, and then implements the pairing of the first user device and the third user device through the attach process.

The implementation process will be described below in detail with several embodiments.

Figure 2:
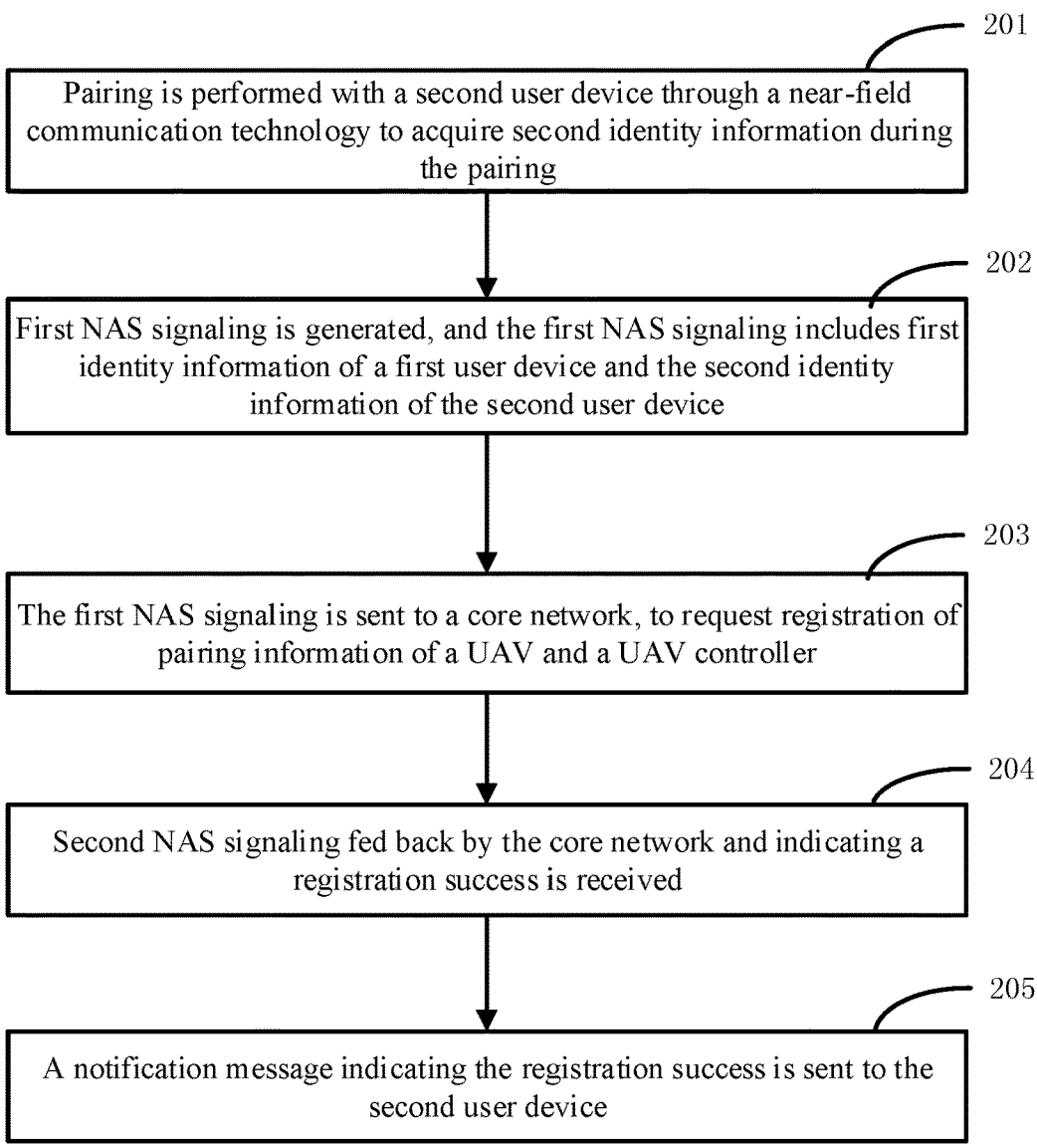
FIG. 2 is a flow chart showing a network registration method, according to an exemplary embodiment.

FIG. 2 is a flow chart showing a network registration method, according to an exemplary embodiment. The network registration method is applied to a user device. As illustrated in FIG. 2, the method may include the following steps 201 to 205.

In step 201, pairing is performed with a second user device through a near-field communication technology to acquire second identity information during the pairing.

In step 202, first NAS signaling is generated, and the first NAS signaling includes first identity information of a first user device and the second identity information of the second user device. When the first user device is a UAV, the second user device is a UAV controller; and when the first user device is the UAV controller, the second user device is the UAV.

In step 203, the first NAS signaling is sent to a core network, to request registration of pairing information of the UAV and the UAV controller.

In step 204, second NAS signaling fed back by the core network and indicating a registration success is received.

In step 205, a notification message indicating the registration success is sent to the second user device.

Figure 3:
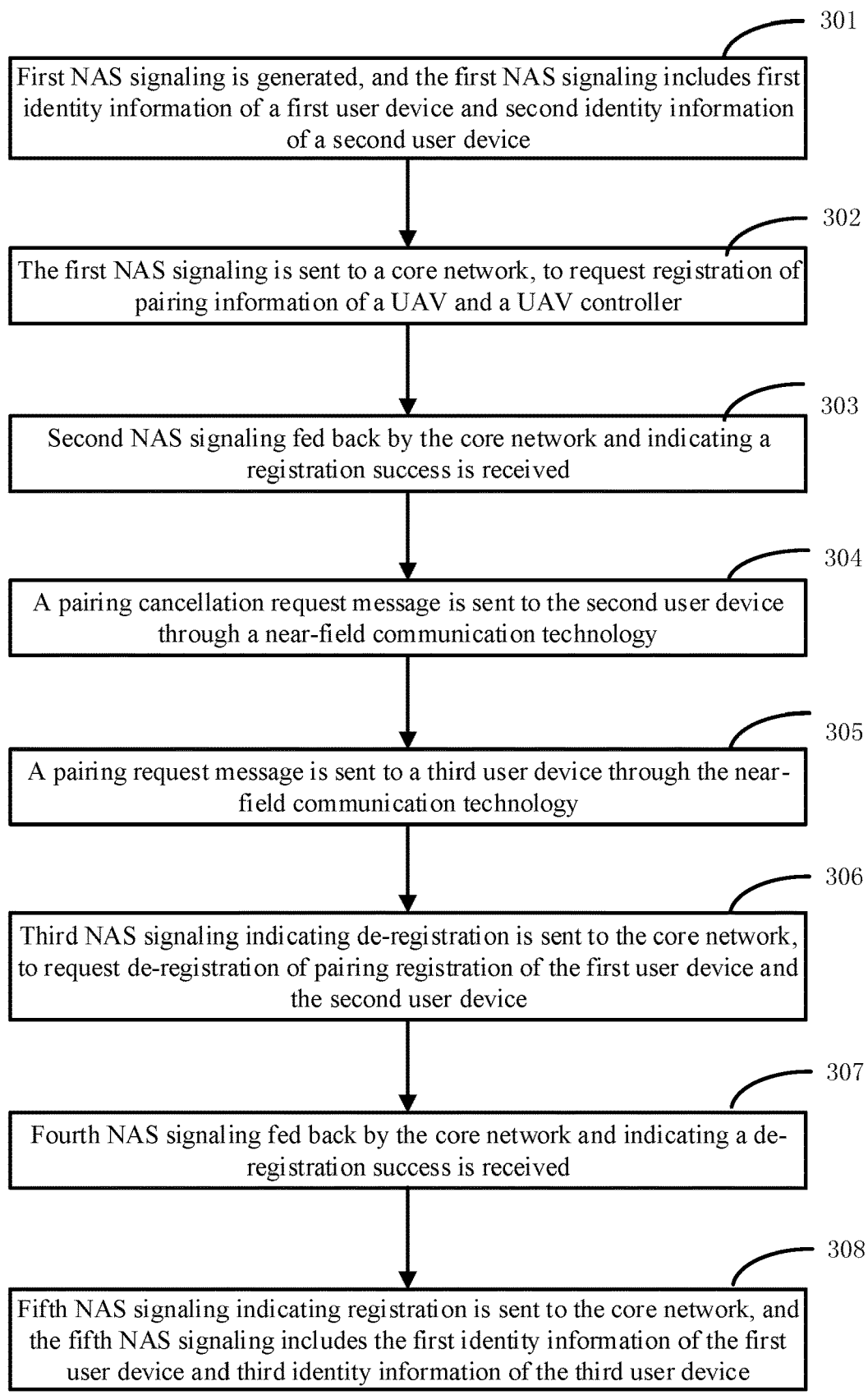
FIG. 3 is a flow chart showing a network registration method, according to an exemplary embodiment.

FIG. 3 is a flow chart showing a network registration method, according to an exemplary embodiment. The network registration method is applied to a user device. As illustrated in FIG. 3, the method may include the following steps 301 to 308.

In step 301, first NAS signaling is generated, and the first NAS signaling includes first identity information of a first user device and second identity information of a second user device. When the first user device is a UAV, the second user device is a UAV controller; and when the first user device is the UAV controller, the second user device is the UAV.

In step 302, the first NAS signaling is sent to a core network, to request registration of pairing information of the UAV and the UAV controller.

In step 303, second NAS signaling fed back by the core network and indicating a registration success is received.

In step 304, a pairing cancellation request message is sent to the second user device through a near-field communication technology.

In step 305, a pairing request message is sent to a third user device through the near-field communication technology.

In step 306, third NAS signaling indicating de-registration is sent to the core network, to request de-registration of pairing registration of the first user device and the second user device.

In step 307, fourth NAS signaling fed back by the core network and indicating a de-registration success is received.

In step 308, fifth NAS signaling indicating registration is sent to the core network, and the fifth NAS signaling includes the first identity information of the first user device and third identity information of the third user device.

The above describes the implementation process of the user device side. The corresponding core network side is also improved to some extent. The implementation process of the core network side will be described below.

Figure 4:
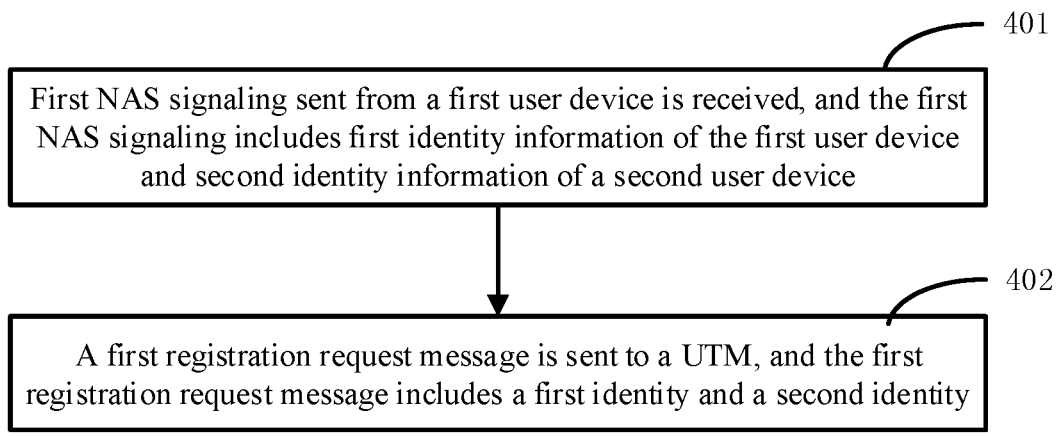
FIG. 4 is a flow chart showing a network registration method, according to an exemplary embodiment.

FIG. 4 is a flow chart showing a network registration method, according to an exemplary embodiment. The network registration method is applied to a device at a core network side. As illustrated in FIG. 4, the method may include the following steps 401 to 402.

In step 401, first NAS signaling sent from a first user device is received, and the first NAS signaling includes first identity information of the first user device and second identity information of a second user device. When the first user device is a UAV, the second user device is a UAV controller; and when the first user device is the UAV controller, the second user device is the UAV.

In step 402, a first registration request message is sent to a UTM, and the first registration request message includes a first identity and a second identity.

In the embodiment, upon the reception of the first identity information and the second identity information, the core network forwards them to the UTM for registration, thereby completing the registration process of the pairing information. The UTM stores the pairing information locally. In the subsequent communication process between the first user device and the second user device, if the core network needs to perform various types of identity identification or authentication on the first user device and the second user device, it may query the pairing information stored in the UTM.

In an embodiment, the first NAS signaling may include attach request signaling.

The embodiment may implement the pairing registration process of the UAV and the UAV controller through an attach process, such that no additional communication process is increased to save the network resource.

In an embodiment, the method may further include step F.

In step F, second NAS signaling indicating a registration success is sent to the first user device.

In the embodiment, when receiving the first NAS signaling sent from the user device, the core network sends the second NAS signaling to the user device sending the first NAS signaling after the registration success, so as to notify the registration success.

Certainly, when the registration is failed, second NAS signaling indicating a registration failure may also be fed back.

In an embodiment, the method may further include step G1 to step G5.

In step G1, third NAS signaling sent from the first user device and indicating de-registration is received, to request de-registration of pairing registration of the first user device and the second user device.

In step G2, a first registration cancellation request message is sent to the UTM.

In step G3, fourth NAS signaling indicating a de-registration success is sent to the first user device.

In step G4, fifth NAS signaling sent from the first user device is received, and the fifth NAS signaling includes the first identity information of the first user device and third identity information of a third user device.

In step G5, a second registration request message is sent to the UTM, and the second registration request message includes the first identity and a third identity.

In the embodiment, upon the reception of the de-registration request (the third NAS signaling), the core network sends the first registration cancellation request message to the UTM, and requests the UTM to delete the locally stored pairing information, thereby implementing de-registration of the pairing information of the first user device and the second user device. Then, the core network notifies the first user device of the de-registration success. The first user device may request registration with the third user device. The UTM stores pairing information of the first user device and the third user device, to implement pairing registration of the first user device and the third user device.

The implementation process will be described below in detail with several embodiments.

Figure 5:
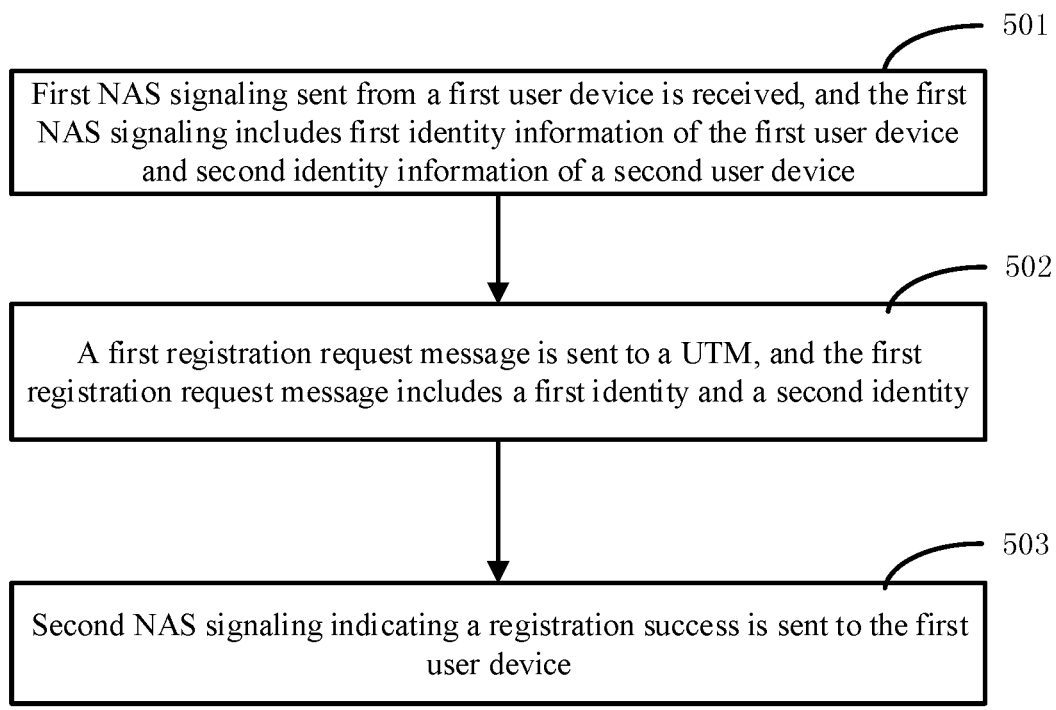
FIG. 5 is a flow chart showing a network registration method, according to an exemplary embodiment.

FIG. 5 is a flow chart showing a network registration method, according to an exemplary embodiment. The network registration method is applied to a device at a core network side. As illustrated in FIG. 5, the method may include the following steps 501 to 503.

In step 501, first NAS signaling sent from a first user device is received, and the first NAS signaling includes first identity information of the first user device and second identity information of a second user device. When the first user device is a UAV, the second user device is a UAV controller; and when the first user device is the UAV controller, the second user device is the UAV.

In step 502, a first registration request message is sent to a UTM, and the first registration request message includes a first identity and a second identity.

In step 503, second NAS signaling indicating a registration success is sent to the first user device.

Figure 6:
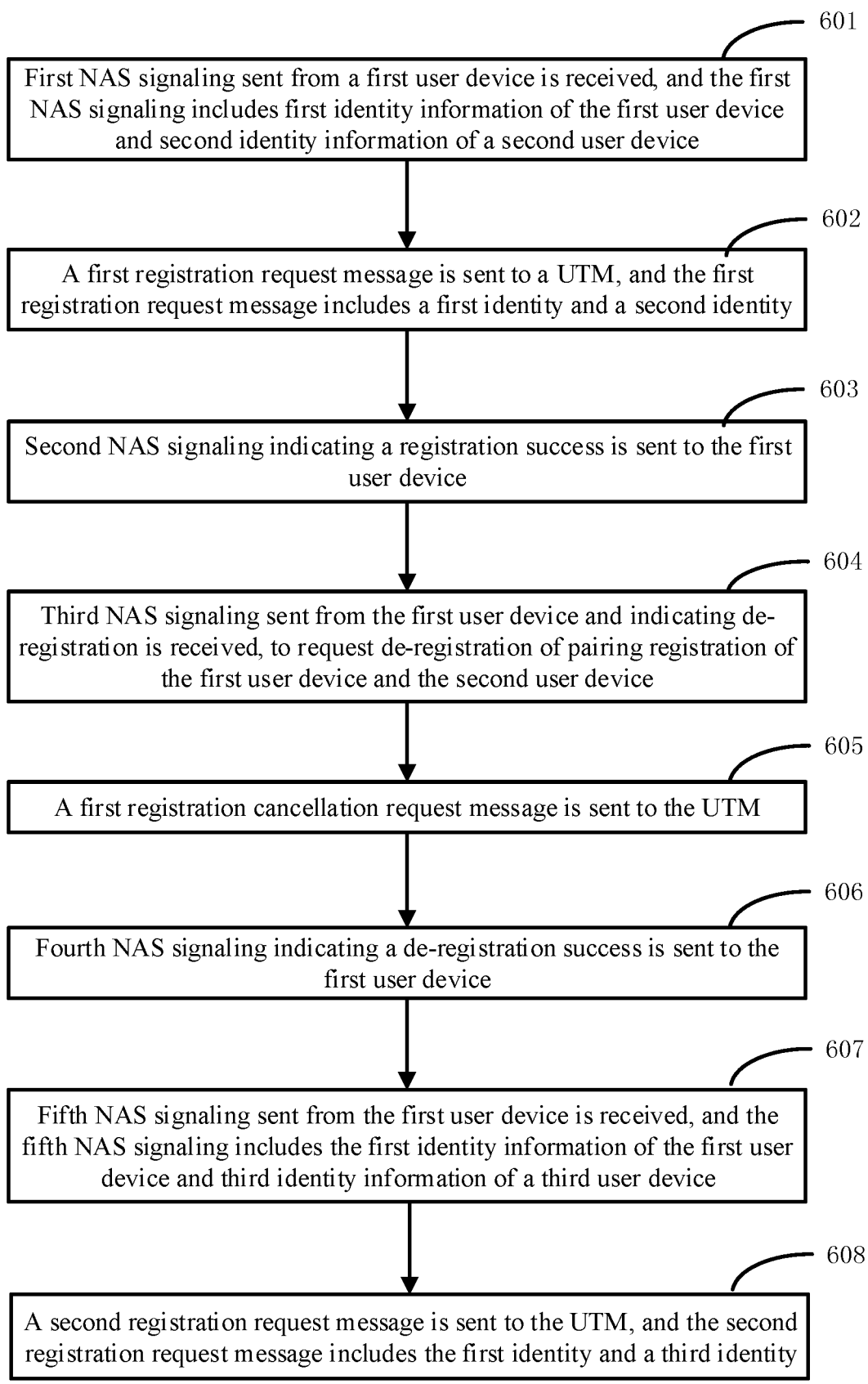
FIG. 6 is a flow chart showing a network registration method, according to an exemplary embodiment.

FIG. 6 is a flow chart showing a network registration method, according to an exemplary embodiment. The network registration method is applied to a device at a core network side. As illustrated in FIG. 6, the method may include the following steps 601 to 608.

In step 601, first NAS signaling sent from a first user device is received, and the first NAS signaling includes first identity information of the first user device and second identity information of a second user device. When the first user device is a UAV, the second user device is a UAV controller; and when the first user device is the UAV controller, the second user device is the UAV.

In step 602, a first registration request message is sent to a UTM, and the first registration request message includes a first identity and a second identity.

In step 603, second NAS signaling indicating a registration success is sent to the first user device.

In step 604, third NAS signaling sent from the first user device and indicating de-registration is received, to request de-registration of pairing registration of the first user device and the second user device.

In step 605, a first registration cancellation request message is sent to the UTM.

In step 606, fourth NAS signaling indicating a de-registration success is sent to the first user device.

In step 607, fifth NAS signaling sent from the first user device is received, and the fifth NAS signaling includes the first identity information of the first user device and third identity information of a third user device.

In step 608, a second registration request message is sent to the UTM, and the second registration request message includes the first identity and a third identity.

The above describes the implementation process of the user device side and the core network side. The corresponding UTM side is also improved to some extent. The implementation process of the UTM side will be described below.

Figure 7:
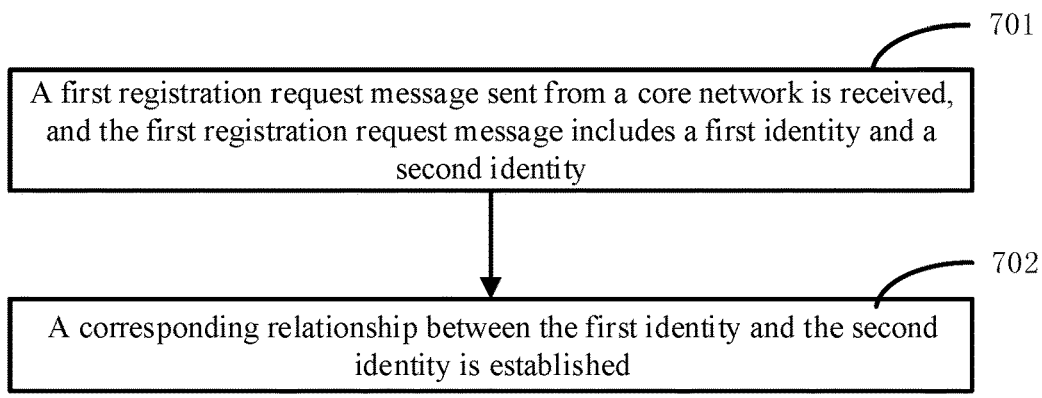
FIG. 7 is a flow chart showing a network registration method, according to an exemplary embodiment.

FIG. 7 is a flow chart showing a network registration method, according to an exemplary embodiment. The network registration method is applied to a UTM. As illustrated in FIG. 7, the method may include the following steps 701 to 702.

In step 701, a first registration request message sent from a core network is received, and the first registration request message includes a first identity and a second identity.

In step 702, a corresponding relationship between the first identity and the second identity is established.

In the embodiment, the UTM locally stores pairing information of the first user device and the second user device, i.e., establishes the corresponding relationship between the first identity and the second identity, to implement pairing registration of the first user device and the second user device, which provides an information support for the core network to subsequently perform processing such as identification and authentication on the first user device and the second user device.

In an embodiment, the method may further include step H1 to step H4.

In step H1, a first registration cancellation request message sent from the core network is received.

In step H2, the corresponding relationship between the first identity and the second identity is canceled.

In step H3, a second registration request message sent from the core network is received, and the second registration request message includes the first identity and a third identity.

In step H4, a corresponding relationship between the first identity and the third identity is established.

In the embodiment, in the pairing de-registration process of the first user device and the second user device, the UTM cancels the corresponding relationship between the first identity and the second identity, and may delete the pairing information of the first identity and the second identity. In the pairing registration process of the first identity and the third identity, the UTM establishes the corresponding relationship between the first identity and the third identity, and stores the pairing information of the first identity and the third identity.

The implementation process will be described below in detail with the embodiment.

Figure 8:
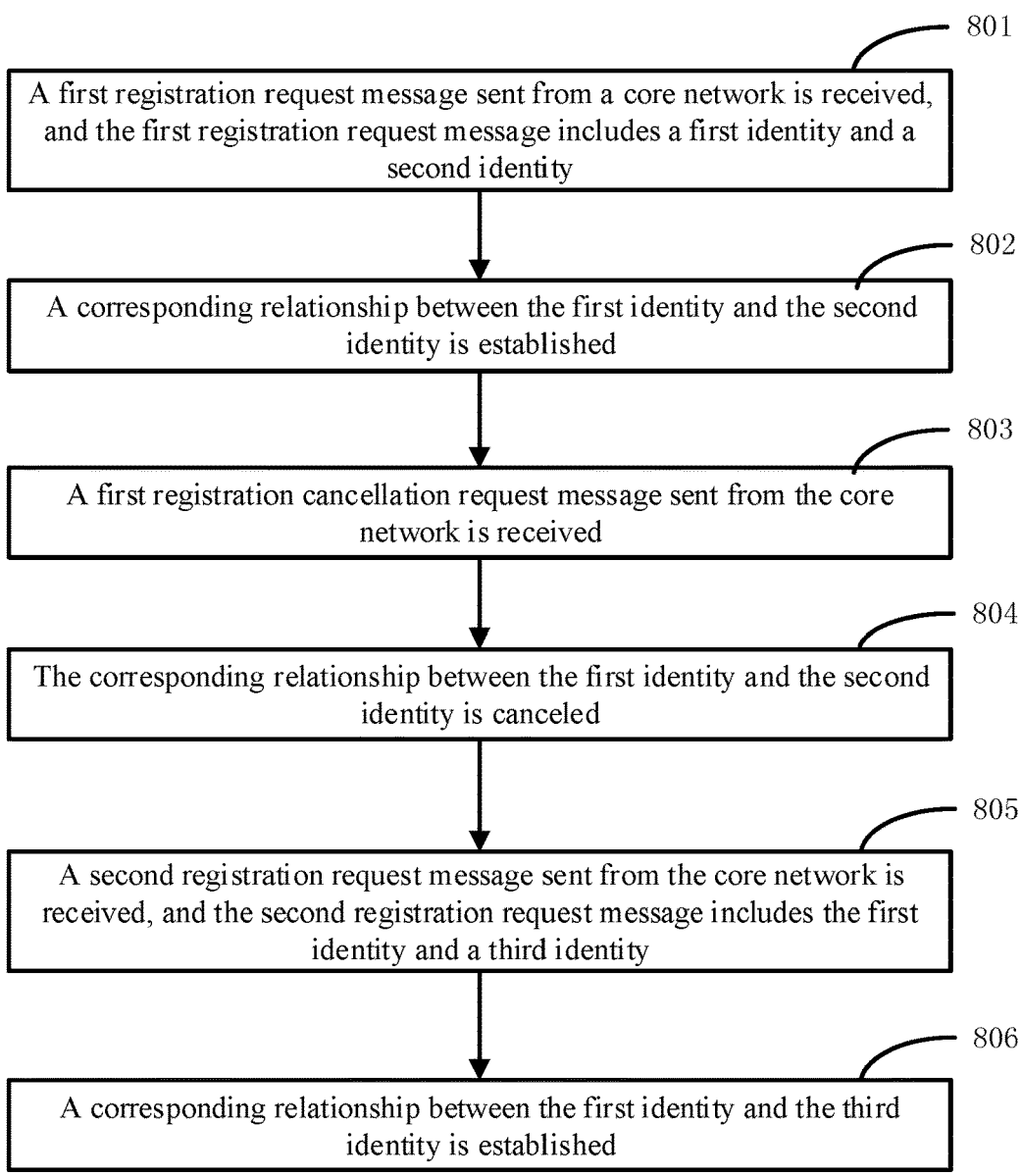
FIG. 8 is a flow chart showing a network registration method, according to an exemplary embodiment.

FIG. 8 is a flow chart showing a network registration method, according to an exemplary embodiment. The network registration method is applied to a UTM. As illustrated in FIG. 8, the method may include the following steps 801 to 806.

In step 801, a first registration request message sent from a core network is received, and the first registration request message includes a first identity and a second identity.

In step 802, a corresponding relationship between the first identity and the second identity is established.

In step 803, a first registration cancellation request message sent from the core network is received.

In step 804, the corresponding relationship between the first identity and the second identity is canceled.

In step 805, a second registration request message sent from the core network is received, and the second registration request message includes the first identity and a third identity.

In step 806, a corresponding relationship between the first identity and the third identity is established.

The implementation process will be described in combination with the user device side, the core network side and the UTM side.

Figure 9:
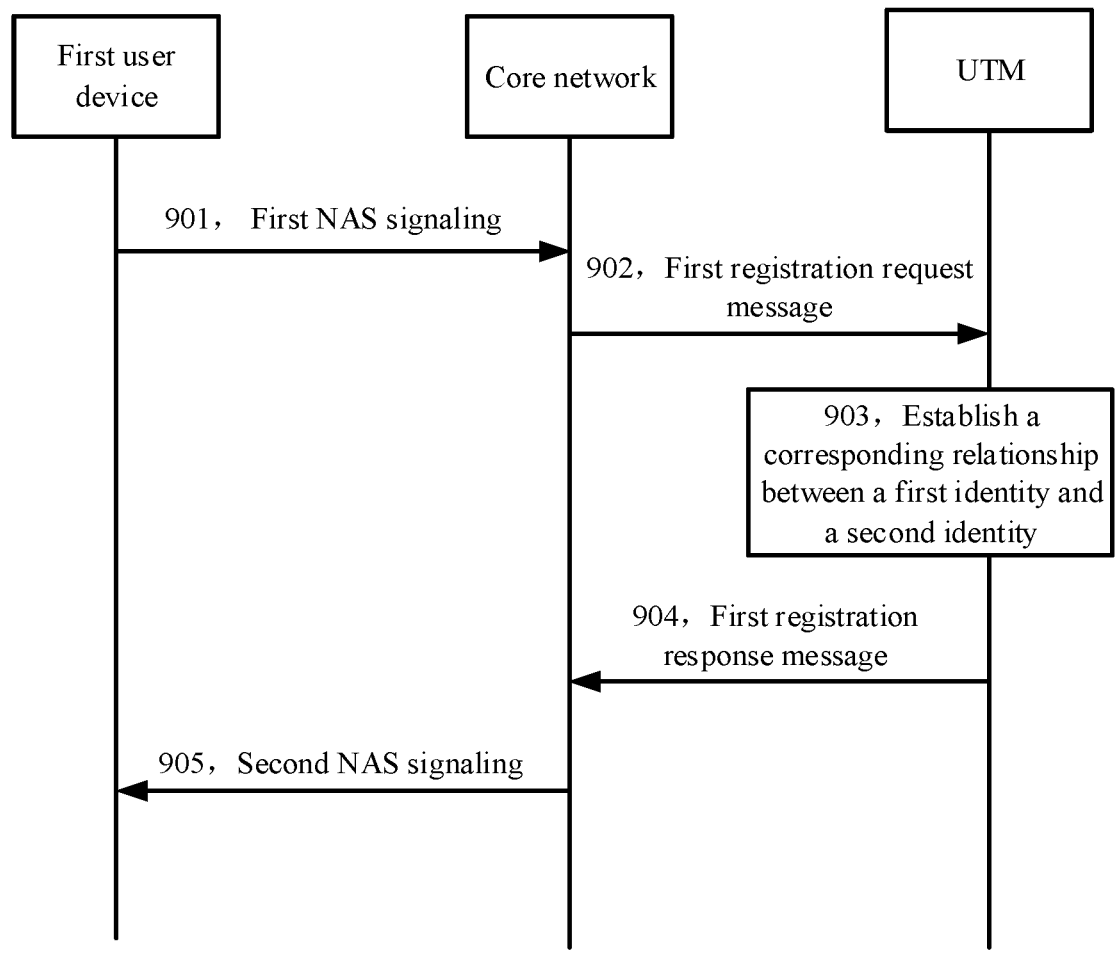
FIG. 9 is a flow chart showing a network registration method, according to an exemplary embodiment.

FIG. 9 is a flow chart showing a network registration method, according to an exemplary embodiment. As illustrated in FIG. 9, the method may include the following steps 901 to 905.

In step 901, a first user device sends first NAS signaling to a core network, to request registration of pairing information of a UAV and a UAV controller. The first NAS signaling includes a first identity and a second identity.

In step 902, the core network sends a first registration request message to a UTM, and the first registration request message includes the first identity and the second identity.

In step 903, the UTM establishes a corresponding relationship between the first identity and the second identity.

In step 904, the UTM sends a first registration response message to the core network, to notify the core network of that the registration is completed.

In step 905, the core network sends second NAS signaling indicating a registration success to the first user device.

The above embodiments may be combined freely according to an actual need.

The apparatus embodiments of the disclosure are set forth hereinafter, and may be configured to execute the method embodiments of the disclosure.

Figure 10:
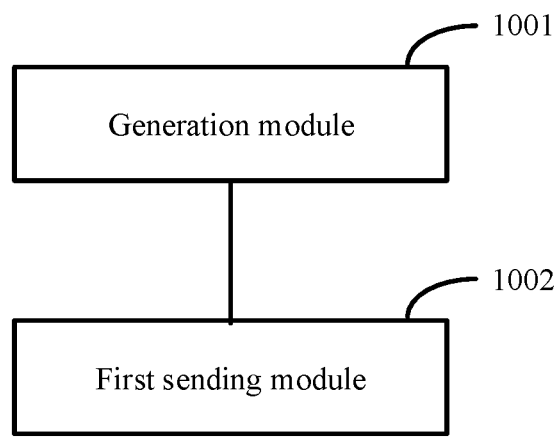
FIG. 10 is a block diagram illustrating a network registration apparatus, according to an exemplary embodiment.

FIG. 10 is a block diagram illustrating a network registration apparatus, according to an exemplary embodiment. The apparatus may be implemented through software, hardware or a combination thereof to form a part or all of the electronic device. The apparatus is applied to a first user device. Referring to FIG. 10, the network registration apparatus may include a generation module 1001 and a first sending module 1002.

The generation module 1001 is configured to generate first NAS signaling, and the first NAS signaling includes first identity information of a first user device and second identity information of a second user device. When the first user device is a UAV, the second user device is a UAV controller; and when the first user device is the UAV controller, the second user device is the UAV.

The first sending module 1002 is configured to send the first NAS signaling to a core network, to request registration of pairing information of the UAV and the UAV controller.

In an embodiment, the first NAS signaling may include attach request signaling.

Figure 11:
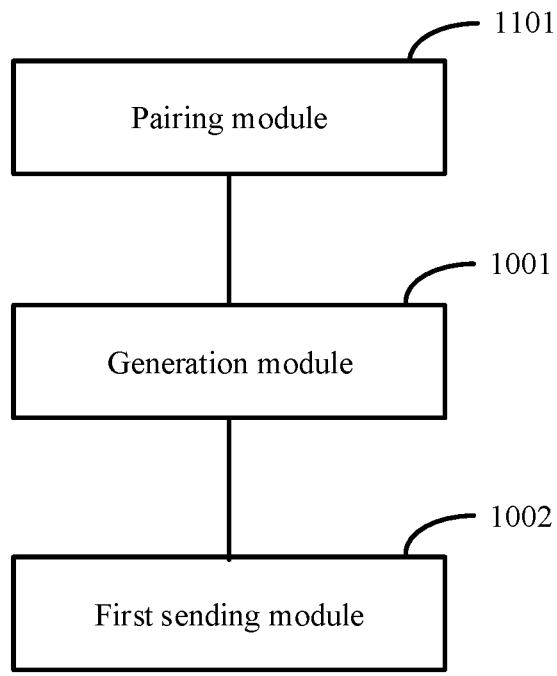
FIG. 11 is a block diagram illustrating a network registration apparatus, according to an exemplary embodiment.

In an embodiment, as illustrated in FIG. 11, the apparatus may further include a pairing module 1101.

The pairing module 1101 is configured to perform pairing with the second user device through a near-field communication technology to acquire the second identity information during the pairing.

Figure 12:
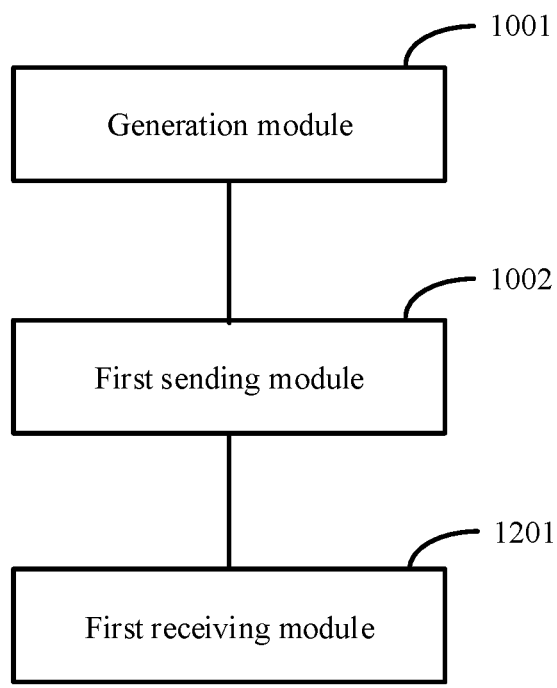
FIG. 12 is a block diagram illustrating a network registration apparatus, according to an exemplary embodiment.

In an embodiment, as illustrated in FIG. 12, the apparatus may further include a first receiving module 1201.

The first receiving module 1201 is configured to receive second NAS signaling fed back by the core network and indicating a registration success.

Figure 13:
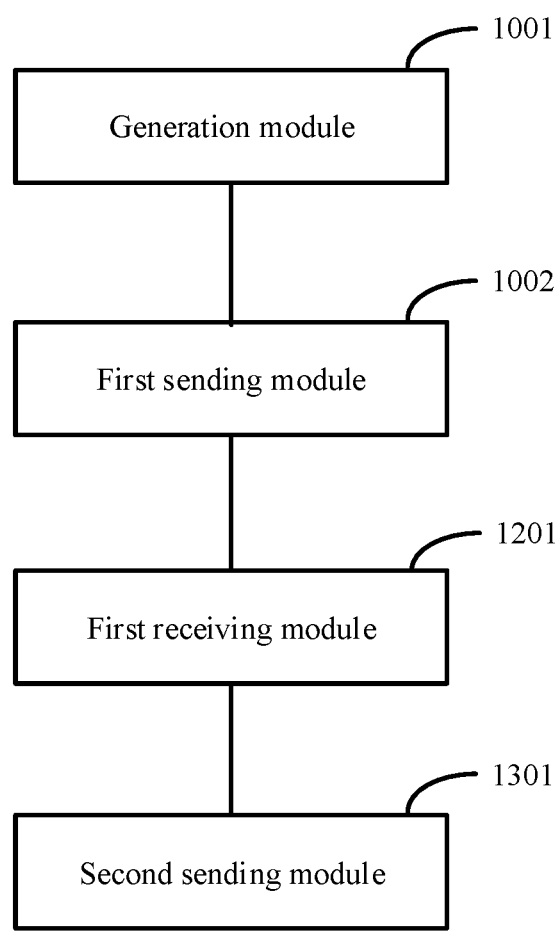
FIG. 13 is a block diagram illustrating a network registration apparatus, according to an exemplary embodiment.

In an embodiment, as illustrated in FIG. 13, the apparatus may further include a second sending module 1301.

The second sending module 1301 is configured to send a notification message indicating the registration success to the second user device.

Figure 14:
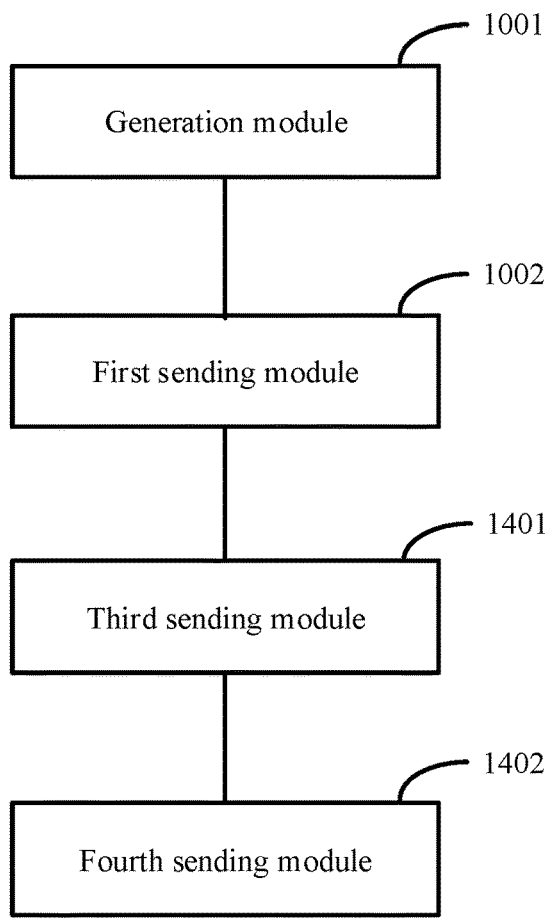
FIG. 14 is a block diagram illustrating a network registration apparatus, according to an exemplary embodiment.
Figure 15:
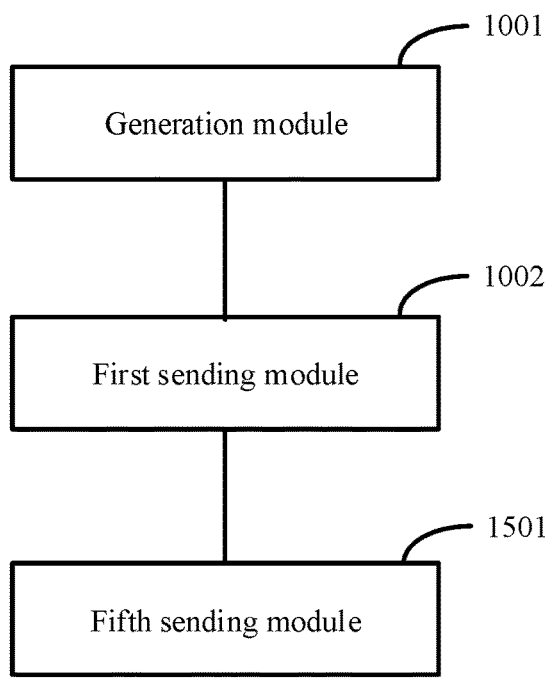
FIG. 15 is a block diagram illustrating a network registration apparatus, according to an exemplary embodiment.

In an embodiment, as illustrated in FIG. 14 and FIG. 15, the apparatus may further include a third sending module 1401 and a fourth sending module 1402, or include a fifth sending module 1501.

The third sending module 1401 is configured to send a pairing cancellation request message to the second user device through the near-field communication technology.

The fourth sending module 1402 is configured to send a pairing request message to a third user device through the near-field communication technology.

The fifth sending module 1501 is configured to send the pairing request message to the third user device through the near-field communication technology, and cancel the pairing with the second user device.

Figure 16:
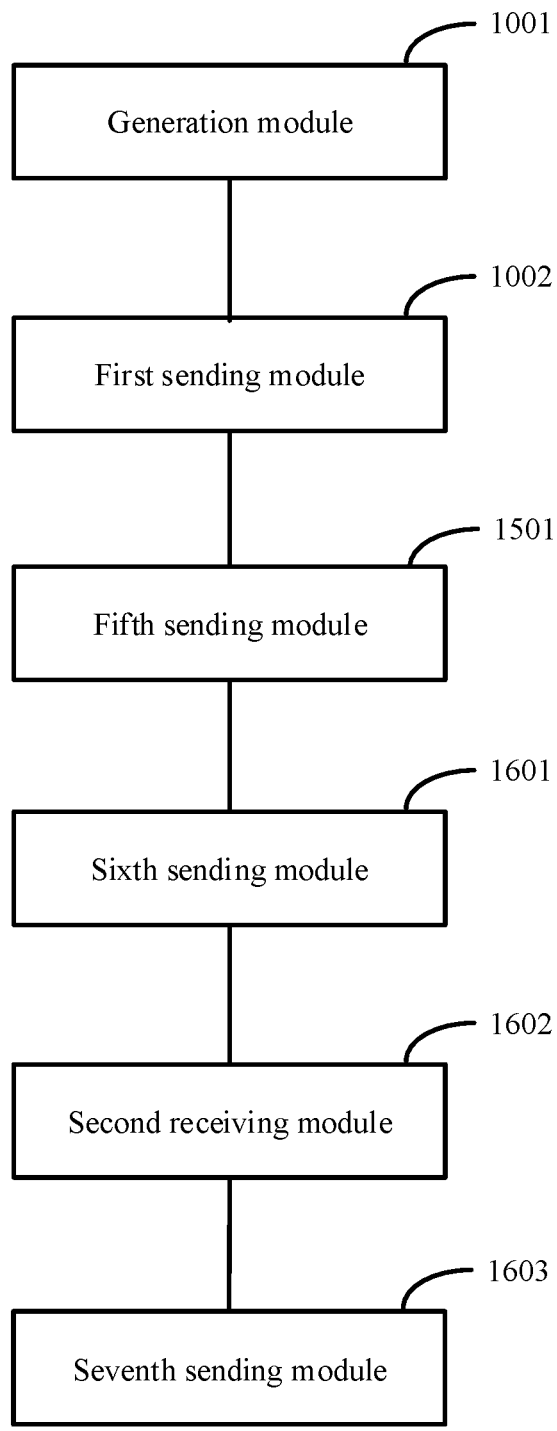
FIG. 16 is a block diagram illustrating a network registration apparatus, according to an exemplary embodiment.

In an embodiment, as illustrated in FIG. 16, the apparatus may further include a sixth sending module 1601, a second receiving module 1602 and a seventh sending module 1603.

The sixth sending module 1601 is configured to send third NAS signaling indicating de-registration to the core network, to request de-registration of pairing registration of the first user device and the second user device.

The second receiving module 1602 is configured to receive fourth NAS signaling fed back by the core network and indicating a de-registration success.

The seventh sending module 1603 is configured to send fifth NAS signaling indicating registration to the core network, and the fifth NAS signaling includes the first identity information of the first user device and third identity information of the third user device.

In an embodiment, the third NAS signaling may include attach cancellation request signaling.

Figure 17:
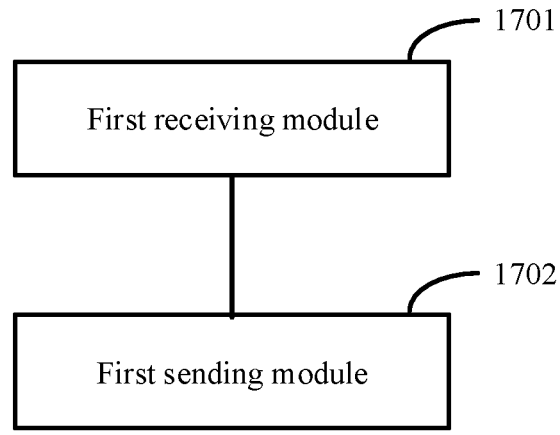
FIG. 17 is a block diagram illustrating a network registration apparatus, according to an exemplary embodiment.

FIG. 17 is a block diagram illustrating a network registration apparatus, according to an exemplary embodiment. The apparatus may be implemented through software, hardware or a combination thereof to form a part or all of the electronic device. The apparatus is applied to a core network side. Referring to FIG. 17, the network registration apparatus may include a first receiving module 1701 and a first sending module 1702.

The first receiving module 1701 is configured to receive first NAS signaling sent from a first user device, and the first NAS signaling includes first identity information of the first user device and second identity information of a second user device. When the first user device is a UAV, the second user device is a UAV controller; and when the first user device is the UAV controller, the second user device is the UAV.

The first sending module 1702 is configured to send a first registration request message to a UTM, and the first registration request message includes a first identity and a second identity.

In an embodiment, the first NAS signaling may include attach request signaling.

Figure 18:
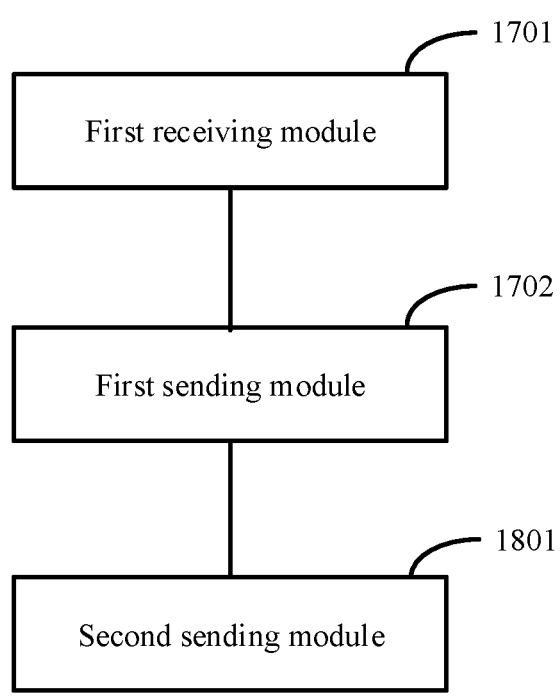
FIG. 18 is a block diagram illustrating a network registration apparatus, according to an exemplary embodiment.

In an embodiment, as illustrated in FIG. 18, the apparatus may further include a second sending module 1801.

The second sending module 1801 is configured to send second NAS signaling indicating a registration success to the first user device.

Figure 19:
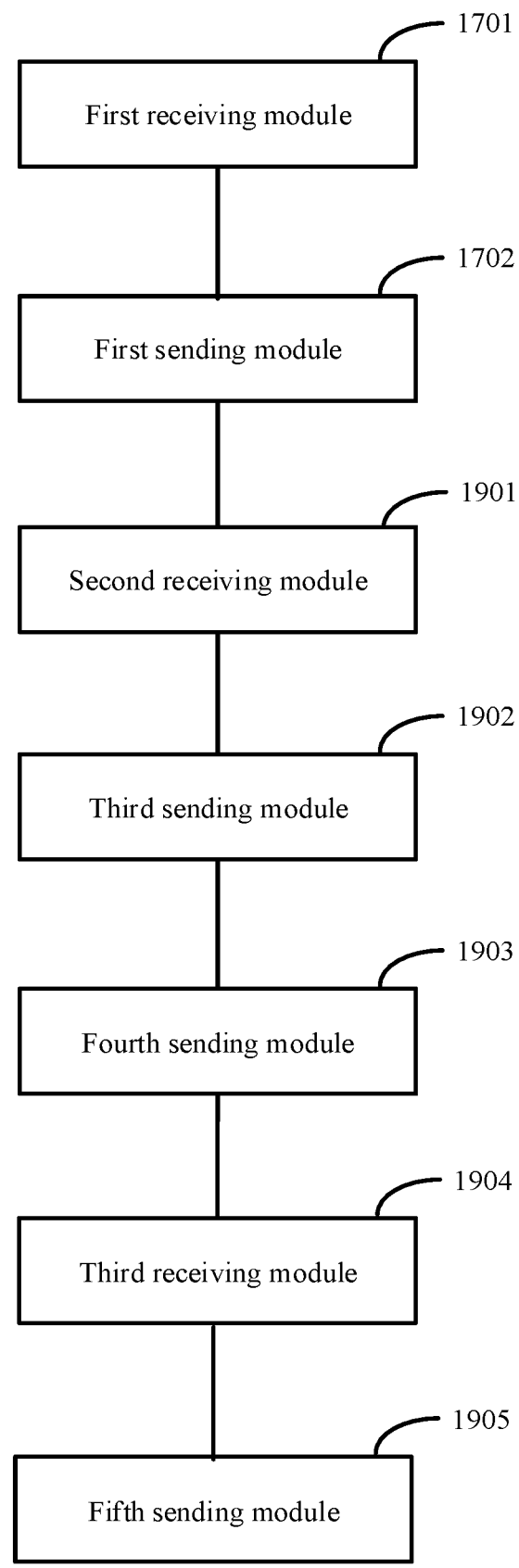
FIG. 19 is a block diagram illustrating a network registration apparatus, according to an exemplary embodiment.

In an embodiment, as illustrated in FIG. 19, the apparatus may further include a second receiving module 1901, a third sending module 1902, a fourth sending module 1903, a third receiving module 1904 and a fifth sending module 1905.

The second receiving module 1901 is configured to receive third NAS signaling sent from the first user device and indicating de-registration, to request de-registration of pairing registration of the first user device and the second user device.

The third sending module 1902 is configured to send a first registration cancellation request message to the UTM.

The fourth sending module 1903 is configured to send fourth NAS signaling indicating a de-registration success to the first user device.

The third receiving module 1904 is configured to receive fifth NAS signaling sent from the first user device, and the fifth NAS signaling includes the first identity information of the first user device and third identity information of a third user device.

The fifth sending module 1905 is configured to send a second registration request message to the UTM, and the second registration request message includes the first identity and a third identity.

Figure 20:
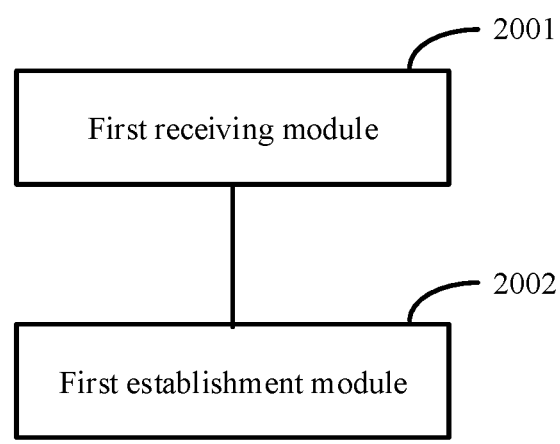
FIG. 20 is a block diagram illustrating a network registration apparatus, according to an exemplary embodiment.

FIG. 20 is a block diagram illustrating a network registration apparatus, according to an exemplary embodiment. The apparatus may be implemented through software, hardware or a combination thereof to form a part or all of the electronic device. The apparatus is applied to a UTM. Referring to FIG. 20, the network registration apparatus may include a first receiving module 2001 and a first establishment module 2002.

The first receiving module 2001 is configured to receive a first registration request message sent from a core network, and the first registration request message included a first identity and a second identity.

The first establishment module 2002 is configured to establish a corresponding relationship between the first identity and the second identity.

Figure 21:
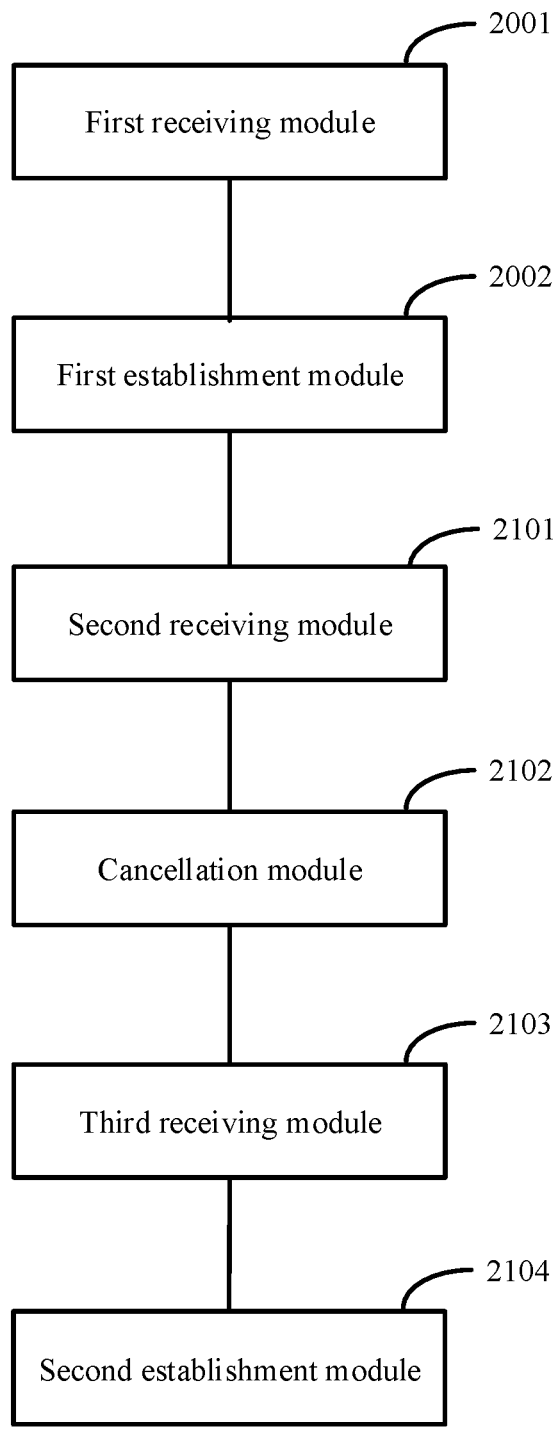
FIG. 21 is a block diagram illustrating a network registration apparatus, according to an exemplary embodiment.

In an embodiment, as illustrated in FIG. 21, the apparatus may further include a second receiving module 2101, a cancellation module 2102, a third receiving module 2103 and a second establishment module 2104.

The second receiving module 2101 is configured to receive a first registration cancellation request message sent from the core network.

The cancellation module 2102 is configured to cancel the corresponding relationship between the first identity and the second identity.

The third receiving module 2103 is configured to receive a second registration request message sent from the core network, and the second registration request message includes the first identity and a third identity.

The second establishment module 2104 is configured to establish a corresponding relationship between the first identity and the third identity.

For the apparatus in the above embodiments, the specific mode for the operation executed by each module has been described in detail in the embodiments related to the method, and is not elaborated herein.

Figure 22:
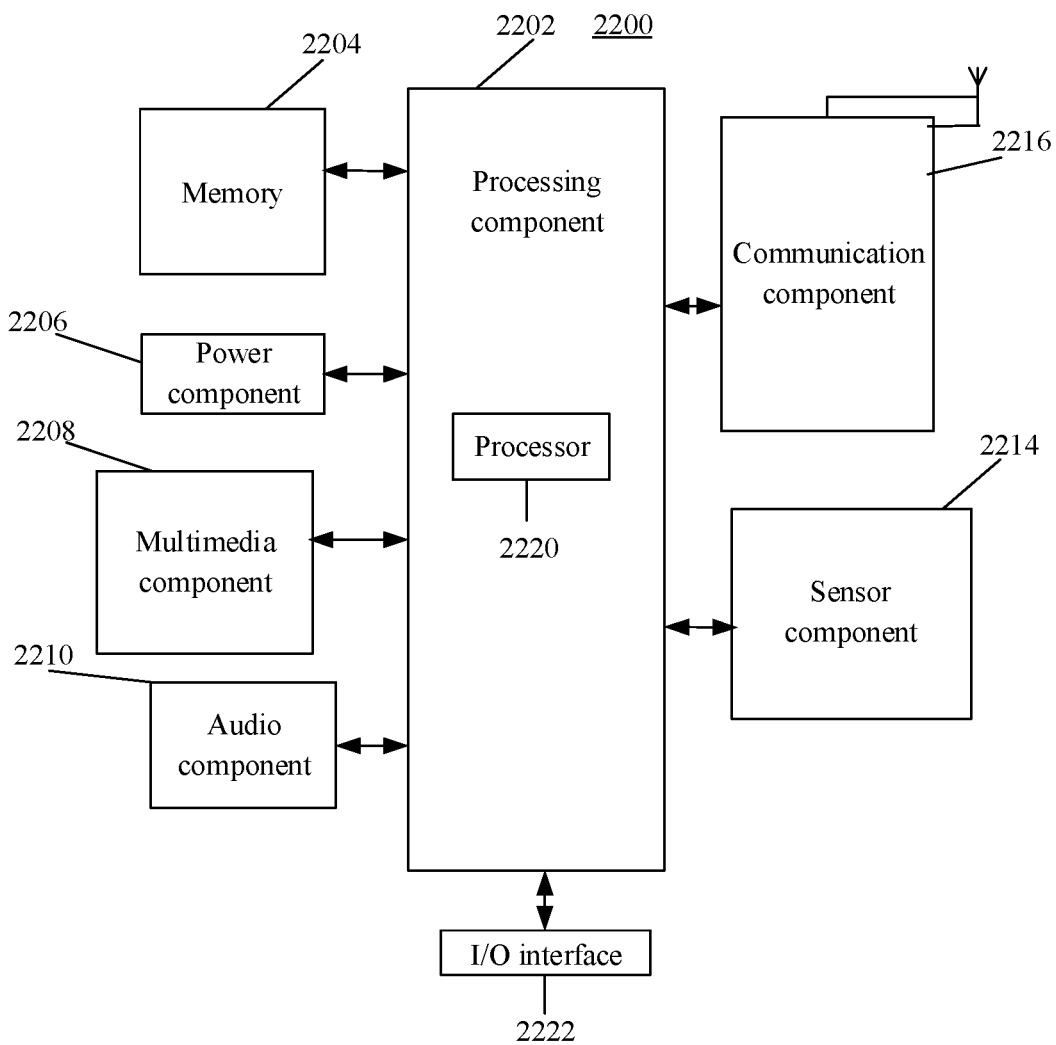
FIG. 22 is a block diagram illustrating an apparatus applied to network registration, according to an exemplary embodiment.

FIG. 22 is a block diagram illustrating an apparatus applied to network registration according to an exemplary embodiment. For example, the apparatus 2200 may be a mobile phone, a computer, a digital broadcast terminal, a messaging device, a gaming console, a tablet, a medical device, exercise equipment, a personal digital assistant (PDA), and the like.

The apparatus 2200 may include one or more of the following components: a processing component 2202, a memory 2204, a power component 2206, a multimedia component 2208, an audio component 2210, an input/output (I/O) interface 2222, a sensor component 2214, or a communication component 2216.

The processing component 2202 typically controls overall operations of the apparatus 2200, such as the operations associated with display, telephone calls, data communications, camera operations, and recording operations. The processing component 2202 may include one or more processors 2220 to execute instructions to perform all or part of the steps in the abovementioned methods. Moreover, the processing component 2202 may include one or more modules which facilitate interaction between the processing component 2202 and other components. For instance, the processing component 2202 may include a multimedia module to facilitate interaction between the multimedia component 2208 and the processing component 2202.

The memory 2204 is configured to store various types of data to support the operation of the apparatus 2200. Examples of such data include instructions for any applications or methods operated on the apparatus 2200, contact data, phonebook data, messages, pictures, video, etc. The memory 2204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 2206 provides power for various components of the apparatus 2200. The power component 2206 may include a power management system, one or more power supplies, and other components associated with generation, management and distribution of power for the apparatus 2200.

The multimedia component 2208 includes a screen providing an output interface between the apparatus 2200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 2208 includes a front camera and/or a rear camera. The front camera and/or the rear camera may receive external multimedia data when the apparatus 2200 is in an operation mode, such as a photographing mode or a video mode. Each of the front camera and the rear camera may be a fixed optical lens system or have focusing and optical zooming capabilities.

The audio component 2210 is configured to output and/or input an audio signal. For example, the audio component 2210 includes a microphone (MIC), and the MIC is configured to receive an external audio signal when the apparatus 2200 is in an operation mode, such as a call mode, a recording mode and a voice recognition mode. The received audio signal may further be stored in the memory 2204 or sent via the communication component 2216. In some embodiments, the audio component 2210 further includes a speaker configured to output the audio signal.

The I/O interface 2222 provides an interface between the processing component 2202 and peripheral interface modules, such as a keyboard, a click wheel, buttons and the like. The buttons may include, but are not limited to, a home button, a volume button, a starting button and a locking button.

The sensor component 2214 includes one or more sensors configured to provide status assessments in various aspects for the apparatus 2200. For instance, the sensor component 2214 may detect an on/off status of the apparatus 2200 and relative positioning of components, such as a display and small keyboard of the apparatus 2200, and the sensor component 1214 may further detect a change in a position of the apparatus 2200 or a component of the apparatus 2200, presence or absence of contact between the user and the apparatus 2200, orientation or acceleration/deceleration of the apparatus 2200 and a change in temperature of the apparatus 2200. The sensor component 2214 may include a proximity sensor configured to detect presence of an object nearby without any physical contact. The sensor component 2214 may also include a light sensor, such as a complementary metal oxide semiconductor (CMOS) or charge coupled device (CCD) image sensor, configured for use in an imaging application. In some embodiments, the sensor component 2214 may also include an acceleration sensor, a gyroscope sensor, a magnetic sensor, a pressure sensor or a temperature sensor.

The communication component 2216 is configured to facilitate wired or wireless communication between the apparatus 2200 and other devices. The apparatus 2200 may access a communication-standard-based wireless network, such as a WiFi network, a 2nd-generation (2G) or 3rd-generation (3G) network, or a combination thereof. In an exemplary embodiment, the communication component 2216 receives a broadcast signal or broadcast associated information from an external broadcast management system via a broadcast channel. In an exemplary embodiment, the communication component 2216 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the apparatus 2200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned methods.

In exemplary embodiments, there is also provided a non-transitory computer-readable storage medium including instructions, such as included in the memory 2204, executable by the processor 2220 of the apparatus 2200 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

In an exemplary embodiment, a network registration apparatus is provided, which may include a processor and a memory which is configured to store instructions executable by the processor.

The processor is configured to:
generate first NAS signaling; the first NAS signaling including first identity information of a first user device and second identity information of a second user device, the second user device being a UAV controller responsive to that the first user device is a UAV, and the second user device being the UAV responsive to that the first user device is the UAV controller; and
send the first NAS signaling to a core network, to request registration of pairing information of the UAV and the UAV controller.

The processor may further be configured as follows:
the first NAS signaling may include attach request signaling.

The processor may further be configured as follows:
before the first NAS signaling is generated, the method may further include: pairing is performed with the second user device through a near-field communication technology to acquire the second identity information during the pairing.

The processor may further be configured as follows:
the method may further include: second NAS signaling fed back by the core network and indicating a registration success is received.

The processor may further be configured as follows:
the method may further include: a notification message indicating the registration success is sent to the second user device.

The processor may further be configured as follows:
the method may further include: a pairing cancellation request message is sent to the second user device through a near-field communication technology, and a pairing request message is sent to a third user device through the near-field communication technology; or, a pairing request message is sent to the third user device through the near-field communication technology, and pairing with the second user device is canceled.

The processor may further be configured as follows:
the method may further include: third NAS signaling indicating de-registration is sent to the core network, to request de-registration of pairing registration of the first user device and the second user device; fourth NAS signaling fed back by the core network and indicating a de-registration success is received; fifth NAS signaling indicating registration is sent to the core network, and the fifth NAS signaling includes the first identity information of the first user device and third identity information of the third user device.

The processor may further be configured as follows:
the third NAS signaling may include attach cancellation request signaling.

A computer-readable storage medium is provided; and when instructions in the storage medium are executed by a processor of an apparatus, the apparatus can execute the above network registration method. The method may include the following operations.

First NAS signaling is generated, and the first NAS signaling includes first identity information of a first user device and second identity information of a second user device. When the first user device is a UAV, the second user device is a UAV controller; and when the first user device is the UAV controller, the second user device is the UAV.

The first NAS signaling is sent to a core network, to request registration of pairing information of the UAV and the UAV controller.

The instructions in the storage medium may further include:
the first NAS signaling may include attach request signaling.

The instructions in the storage medium may further include:
before the first NAS signaling is generated, the method may further include: pairing is performed with the second user device through a near-field communication technology to acquire the second identity information during the pairing.

The instructions in the storage medium may further include:
the method may further include: second NAS signaling fed back by the core network and indicating a registration success is received.

The instructions in the storage medium may further include:
the method may further include: a notification message indicating the registration success is sent to the second user device.

The instructions in the storage medium may further include:
the method may further include: a pairing cancellation request message is sent to the second user device through a near-field communication technology, and a pairing request message is sent to a third user device through the near-field communication technology; or, a pairing request message is sent to the third user device through the near-field communication technology, and pairing with the second user device is canceled.

The instructions in the storage medium may further include:
the method may further include: third NAS signaling indicating de-registration is sent to the core network, to request de-registration of pairing registration of the first user device and the second user device; fourth NAS signaling fed back by the core network and indicating a de-registration success is received; fifth NAS signaling indicating registration is sent to the core network, and the fifth NAS signaling includes the first identity information of the first user device and third identity information of the third user device.

The instructions in the storage medium may further include:

the third NAS signaling may include attach cancellation request signaling.

Figure 23:
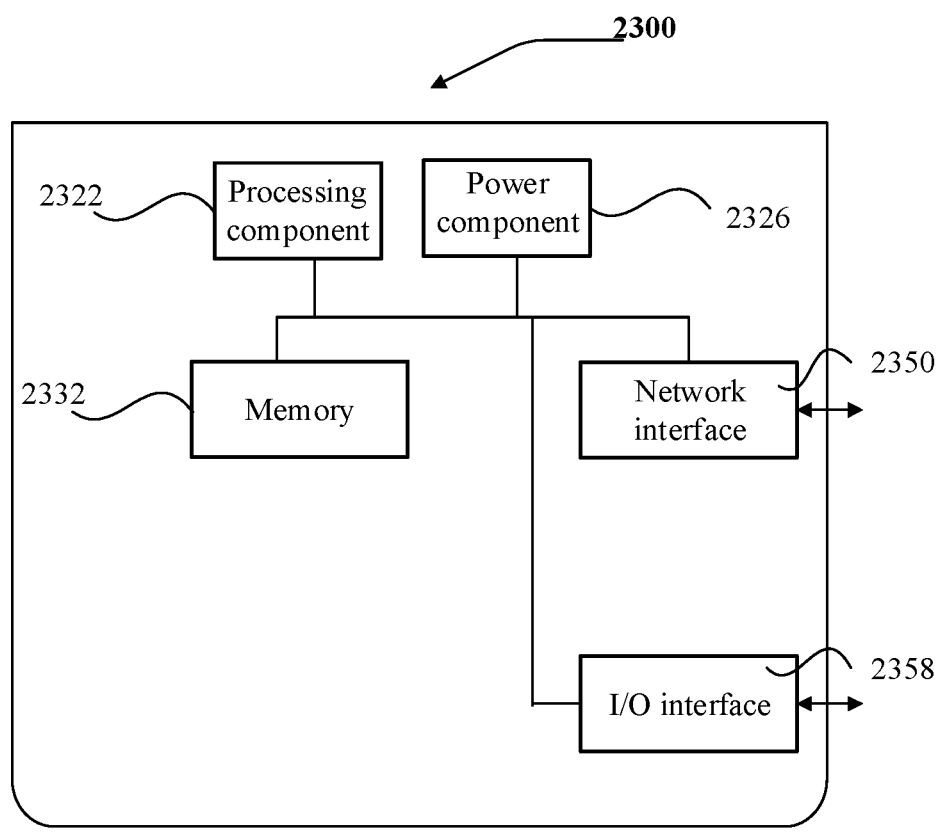
FIG. 23 is a block diagram illustrating an apparatus applied to network registration, according to an exemplary embodiment.

FIG. 23 is a block diagram illustrating an apparatus 2300 applied to network registration according to an exemplary embodiment. For example, the apparatus 2300 may be provided as a computer. Referring to FIG. 23, the apparatus 2300 includes a processing component 2322, and further includes one or more processors, and a memory resource represented by a memory 2332 and configured to store instructions that may be executed by the processing component 2322, such as an application program. The application program stored in the memory 2332 may include one or more modules, with each module corresponding to one group of instructions. In addition, the processing component 2322 is configured to execute the instructions, to execute the above method.

The apparatus 2300 may further include a power component 2326, configured to execute power management of the apparatus 2300, a wired or wireless network interface 2350 configured to connect the apparatus 2300 to the network, and an I/O interface 2358. The apparatus 2300 may be operated based on an operating system stored in the memory 2332, for example, Windows Server™, Mac OS X™, Unix™, Linux™, FreeBSD™ or the like.

In an exemplary embodiment, a network registration apparatus is provided, which may include: a processor and a memory which is configured to store instructions executable by the processor.

The processor is configured to:

receive first NAS signaling sent from a first user device, the first NAS signaling including first identity information of the first user device and second identity information of a second user device, the second user device being a UAV controller responsive to that the first user device is a UAV, and the second user device being the UAV responsive to that the first user device is the UAV controller; and send a first registration request message to a UTM, the first registration request message including a first identity and a second identity.

The processor may further be configured as follows:

The first NAS signaling may include attach request signaling.

The processor may further be configured as follows:

the method may further include: second NAS signaling indicating a registration success is sent to the first user device.

The processor may further be configured as follows:

The method may further include: third NAS signaling sent from the first user device and indicating de-registration is received, to request de-registration of pairing registration of the first user device and the second user device; a first registration cancellation request message is sent to the UTM; fourth NAS signaling indicating a de-registration success is sent to the first user device; fifth NAS signaling sent from the first user device is received, and the fifth NAS signaling includes the first identity information of the first user device and third identity information of a third user device; and a second registration request message is sent to the UTM, and the second registration request message includes the first identity and a third identity.

A computer-readable storage medium is provided; and when instructions in the storage medium are executed by a processor of an apparatus, the apparatus can execute the above network registration method. The method may include the following operations.

First NAS signaling sent from a first user device is received, and the first NAS signaling includes first identity information of the first user device and second identity information of a second user device. When the first user device is a UAV, the second user device is a UAV controller; and when the first user device is the UAV controller, the second user device is the UAV.

A first registration request message is sent to a UTM, and the first registration request message includes a first identity and a second identity.

The instructions in the storage medium may further include:

the first NAS signaling may include attach request signaling.

The instructions in the storage medium may further include:

the method may further include: second NAS signaling indicating a registration success is sent to the first user device.

The instructions in the storage medium may further include:

the method may further include: third NAS signaling sent from the first user device and indicating de-registration is received, to request de-registration of pairing registration of the first user device and the second user device; a first registration cancellation request message is sent to the UTM; fourth NAS signaling indicating a de-registration success is sent to the first user device; fifth NAS signaling sent from the first user device is received, and the fifth NAS signaling includes the first identity information of the first user device and third identity information of a third user device; and a second registration request message is sent to the UTM, and the second registration request message includes the first identity and a third identity.

In an exemplary embodiment, a network registration apparatus is provided, which may include a processor and a memory which is configured to store instructions executable by the processor.

The processor is configured to:

receive a first registration request message sent from a core network, the first registration request message including a first identity and a second identity; and establish a corresponding relationship between the first identity and the second identity.

The processor may further be configured as follows:

the method may further include: a first registration cancellation request message sent from the core network is received; the corresponding relationship between the first identity and the second identity is canceled; a second registration request message sent from the core network is received, and the second registration request message includes the first identity and a third identity; and a corresponding relationship between the first identity and the third identity is established.

A computer-readable storage medium is provided; and when instructions in the storage medium are executed by a processor of an apparatus, the apparatus can execute the above network registration method. The method may include the following operations.

A first registration request message sent from a core network is received, and the first registration request message includes a first identity and a second identity.

A corresponding relationship between the first identity and the second identity is established.

The instructions in the storage medium may further include:

the method may further include: a first registration cancellation request message sent from the core network is received; the corresponding relationship between the first identity and the second identity is canceled; a second registration request message sent from the core network is received, and the second registration request message includes the first identity and a third identity; and a corresponding relationship between the first identity and the third identity is established.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A network registration method, applied to a first user device, comprising:
   generating first non-access stratum (NAS) signaling; wherein the first NAS signaling comprises first identity information of a first user device and second identity information of a second user device, the second user device is an unmanned aerial vehicle (UAV) controller responsive to that the first user device is a UAV, and the second user device is the UAV responsive to that the first user device is the UAV controller;
   sending the first NAS signaling to a core network, to request registration of pairing information of the UAV and the UAV controller; and
   receiving second NAD signaling fed back by the core network and indicating a registration success.

2. The method of claim 1, wherein the first NAS signaling comprises attach request signaling.

3. The method of claim 1, before generating the first NAS signaling, further comprising:
   performing pairing with the second user device through a near-field communication technology to acquire the second identity information during the pairing.

4. The method of claim 1, further comprising:
   sending a notification message indicating the registration success to the second user device.

5. The method of claim 1, further comprising:
   sending a pairing cancellation request message to the second user device through a near-field communication technology, and sending a pairing request message to a third user device through the near-field communication technology;
   or,
   sending a pairing request message to the third user device through the near-field communication technology, and canceling pairing with the second user device.

6. The method of claim 5, further comprising:
   sending third NAS signaling indicating de-registration to the core network, to request de-registration of pairing registration of the first user device and the second user device;
   receiving fourth NAS signaling fed back by the core network and indicating a de-registration success; and
   sending fifth NAS signaling indicating registration to the core network; wherein the fifth NAS signaling comprises the first identity information of the first user device and third identity information of the third user device.

7. The method of claim 6, wherein the third NAS signaling comprises attach cancellation request signaling.

8. A network registration apparatus implementing the method of claim 1, comprising:
   a processor; and
   a memory configured to store instructions executable by the processor;
   wherein the processor is configured to implement steps of the method.

9. A non-transitory computer-readable storage medium, on which computer instructions are stored, wherein the instructions are executed by a processor to implement the method of claim 1.

10. A network registration method, applied to a core network side, comprising:
    receiving first non-access stratum (NAS) signaling sent from a first user device; wherein the first NAS signaling comprises first identity information of the first user device and second identity information of a second user device, the second user device is an unmanned aerial vehicle (UAV) controller responsive to that the first user device is a UAV, and the second user device is the UAV responsive to that the first user device is the UAV controller;
    sending a first registration request message to an unmanned aircraft system (UAS) traffic management (UTM); wherein the first registration request message comprises a first identity and a second identity; and
    sending second NAS signaling indication a registration success to the first user device.

11. The method of claim 10, wherein the first NAS signaling comprises attach request signaling.

12. The method of claim 10, further comprising:
    receiving third NAS signaling sent from the first user device and indicating de-registration, to request de-registration of pairing registration of the first user device and the second user device;
    sending a first registration cancellation request message to the UTM;
    sending fourth NAS signaling indicating a de-registration success to the first user device;
    receiving fifth NAS signaling sent from the first user device; wherein the fifth NAS signaling comprises the first identity information of the first user device and third identity information of a third user device; and
    sending a second registration request message to the UTM; wherein the second registration request message comprises the first identity and a third identity.

13. A network registration apparatus implementing the method of claim 10, comprising:
a processor; and
a memory configured to store instructions executable by the processor;
wherein the processor is configured to implement steps of the method.

14. A non-transitory computer-readable storage medium, on which computer instructions are stored, wherein the instructions are executed by a processor to implement the method of claim 10.

15. A network registration method, applied to an unmanned aircraft system (UAS) traffic management (UTM), comprising:
receiving a first registration request message sent from a core network;
wherein the first registration request message comprises a first identity and a second identity;
establishing a corresponding relationship between the first identity and the second identity;
receiving a first registration cancellation request message sent from the core network;
canceling the corresponding relationship between the first identity and the second identity;
receiving a second registration request message sent from the core network; wherein the second registration request message comprises the first identity and a third identity; and
establishing a corresponding relationship between the first identity and the third identity.

16. A network registration apparatus implementing the method of claim 13, comprising:
a processor; and
a memory configured to store instructions executable by the processor;
wherein the processor is configured to implement steps of the method.

17. A non-transitory computer-readable storage medium, on which computer instructions are stored, wherein the instructions are executed by a processor to implement the method of claim 15.

* * * * *